United States Patent
Bergström et al.

(10) Patent No.: US 10,893,427 B2
(45) Date of Patent: Jan. 12, 2021

(54) COMMUNICATION TERMINAL, RADIO NETWORK NODE AND METHODS THEREIN

(71) Applicant: Telefonaktiebolaget LM Ericsson (publ), Stockholm (SE)

(72) Inventors: Mattias Bergström, Stockholm (SE); Christopher Callender, Kinross (GB); Muhammad Kazmi, Sundbyberg (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 270 days.

(21) Appl. No.: 15/756,101

(22) PCT Filed: Sep. 21, 2016

(86) PCT No.: PCT/SE2016/050889
§ 371 (c)(1),
(2) Date: Feb. 28, 2018

(87) PCT Pub. No.: WO2017/052457
PCT Pub. Date: Mar. 30, 2017

(65) Prior Publication Data
US 2018/0242183 A1    Aug. 23, 2018

Related U.S. Application Data

(60) Provisional application No. 62/232,531, filed on Sep. 25, 2015.

(51) Int. Cl.
*H04W 24/10*    (2009.01)
*H04L 5/00*    (2006.01)

(52) U.S. Cl.
CPC .............. *H04W 24/10* (2013.01); *H04L 5/001* (2013.01); *H04L 5/0048* (2013.01)

(58) Field of Classification Search
None
See application file for complete search history.

(56) References Cited

U.S. PATENT DOCUMENTS

2011/0216692 A1*    9/2011    Lundsgaard .......... H04W 48/20
                                                                        370/328
2013/0286933 A1*    10/2013    Lee ....................... H04L 1/0026
                                                                        370/315

(Continued)

FOREIGN PATENT DOCUMENTS

WO    2015109516 A1    7/2015
WO    2015123573 A2    8/2015

OTHER PUBLICATIONS

"DRS measurements in LAA", 3GPP TSG-RAN WG2 Meeting #91, R2-153807, Beijing, China, Aug. 24-28, 2015, 1-3.

(Continued)

*Primary Examiner* — Hassan A Phillips
*Assistant Examiner* — Gautam Sharma
(74) *Attorney, Agent, or Firm* — Sage Patent Group

(57) ABSTRACT

Embodiments herein disclose e.g. a method performed by a communication terminal for handling signal measurements in a wireless communication network (1). The communication terminal may adapt a measurement procedure to construct a measurement sample of a reference signal from a cell operated by a radio network node (12); or adjust a filter algorithm of the measurement procedure based on one or more previous valid measurement samples of a previous reference signal from the cell, when measuring on the cell where reference signals are not available for the communication terminal at every designated reference signal occasion.

14 Claims, 11 Drawing Sheets

(56) References Cited

U.S. PATENT DOCUMENTS

| | | | | |
|---|---|---|---|---|
| 2014/0086085 A1* | 3/2014 | Zheng | .................. | H04L 5/0092 |
| | | | | 370/252 |
| 2015/0043386 A1* | 2/2015 | Racz | .................. | H04L 41/044 |
| | | | | 370/255 |
| 2015/0131465 A1* | 5/2015 | Dalsgaard | ............ | H04W 24/10 |
| | | | | 370/252 |
| 2016/0050637 A1* | 2/2016 | Behravan | ............. | H04W 48/16 |
| | | | | 370/350 |
| 2016/0135148 A1* | 5/2016 | Novlan | .................... | H04L 1/00 |
| | | | | 370/329 |
| 2016/0241434 A1* | 8/2016 | Li | ........................ | H04W 24/08 |
| 2016/0277162 A1* | 9/2016 | Dinan | .................. | H04W 36/04 |
| 2017/0094539 A1* | 3/2017 | Narasimha | ............ | H04W 24/08 |
| 2017/0245168 A1* | 8/2017 | Yi | ........................ | H04W 8/005 |
| 2017/0251518 A1* | 8/2017 | Agiwal | ................. | H04W 24/08 |
| 2018/0109987 A1* | 4/2018 | Xu | ........................ | H04W 24/10 |
| 2018/0270822 A1* | 9/2018 | Chae | ................. | H04W 72/0453 |

OTHER PUBLICATIONS

"Layer-3 filtering for WLAN measurements", 3GPP TSG-RAN WG2 #91, Tdoc R2-153643, Beijing, P.R. China, Aug. 24-28, 2015, 1-2.

"RRM Measurements for LAA", 3GPP TSG-RAN2#89, R2-150191, Athens, Greece, Feb. 9-13, 2015, 1-3.

"RRM Measurements for LAA", 3GPP TSG-RAN WG2 #90, Tdoc R2-152480, Fukuoka, Japan, May 25-29, 2015, 1-6.

\* cited by examiner

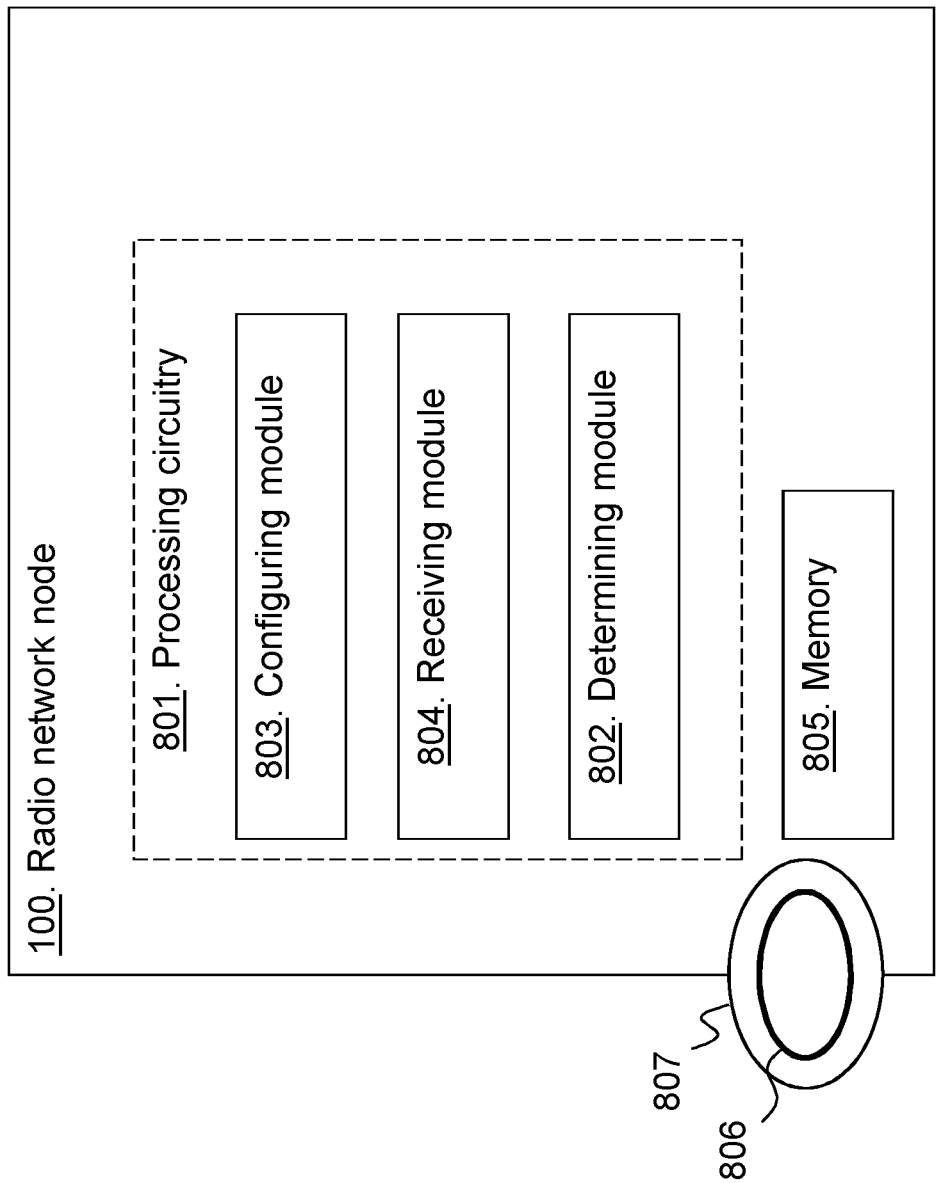

COMMUNICATION TERMINAL, RADIO NETWORK NODE AND METHODS THEREIN

TECHNICAL FIELD

Embodiments herein relate to a communication terminal, a radio network node and methods performed therein for wireless communication. In particular embodiments herein relate to handling signal measurements at the communication terminal.

BACKGROUND

In a typical wireless communication network, communication terminals, also known as mobile stations and/or user equipments (UEs), communicate via a Radio Access Network (RAN) to one or more core networks. The RAN covers a geographical area which is divided into cell areas, with each cell area being served by a radio network node, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The radio base stations communicate over the air interface operating on radio frequencies with the communication terminals within range of the radio base stations.

In some versions of the RAN, several radio base stations are typically connected, e.g., by landlines or microwave, to a controller node, such as a radio network controller (RNC) or a base station controller (BSC), which supervises and coordinates various activities of the plural radio base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for communication terminals. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio network technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

Carrier Aggregation

The LTE specifications have been standardized, supporting Component Carrier (CC) bandwidths up to 20 MHz, which is the maximal LTE Rel-8 carrier bandwidth. Hence, an LTE operation with wider bandwidth than 20 MHz is possible and appear as a number of LTE carriers to a communication terminal.

A straightforward way to obtain this would be by means of Carrier Aggregation (CA). CA implies that an LTE Rel-10 communication terminal can receive multiple CC, where the CC have, or at least the possibility to have, the same structure as a Rel-8 carrier. CA is illustrated in FIG. 1a, wherein a carrier aggregated bandwidth is shown as 100 MHz. The LTE standard support up to 5 aggregated carriers where each carrier is limited in the Radio Frequency (RF) specifications to have a one of six bandwidths namely 6, 15, 25, 50, 75 or 100 Resource Blocks (RB), which corresponds to 1.4, 3 5 10 15 and 20 MHz respectively.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different in downlink and uplink. It is important to note that the number of CCs configured in the wireless communication network may be different from the number of CCs seen by a communication terminal: A communication terminal may for example support more downlink CCs than uplink CCs, even though the wireless communication network offers the same number of uplink and downlink CCs.

During initial access a LTE CA-capable communication terminal behaves similar to a communication terminal not capable of CA. Upon successful connection to the wireless communication network a communication terminal may— depending on its own capabilities and the wireless communication network—be configured with additional CCs in the UL and DL. Configuration is based on Radio Resource Control (RRC). Due to the heavy signaling and rather slow speed of RRC signaling it is envisioned that a communication terminal may be configured with multiple CCs even though not all of them are currently used. If a communication terminal is activated on multiple CCs this would imply it has to monitor all DL CCs for Physical Downlink Control Channel (PDCCH) and Physical Downlink Shared Channel (PDSCH). This implies a wider receiver bandwidth, higher sampling rates, etc. resulting in high power consumption.

In CA the communication terminal is configured with a primary CC, cell or Serving cell, which is referred to as the Primary Cell or PCell. The PCell is particularly important e.g. due to that control signaling is signalled on this cell etc. and also the communication terminal performs monitoring of the radio quality on the PCell. A CA capable communication terminal can, as explained above, also be configured with additional carriers or cells or serving cells, which are referred to as Secondary Cells (SCells).

The term communication terminal and UE will be used interchangeable throughout this document.

Licensed Assisted Access (LAA)

To further improve the performance of LTE systems, 3GPP has started a study on how to enable the use of LTE in unlicensed spectrum which is referred to as Licensed Assisted Access (LAA). As unlicensed spectrum can never match the qualities of licensed spectrum, the intention with LAA is to apply carrier aggregation and using a secondary carrier in an unlicensed band, while having a primary carrier in a licensed band. This will then ensure that the reliability associated with licensed carriers can be enjoyed for the primary carrier and only secondary carriers are used in unlicensed bands.

Listen-Before-Talk

To operate in unlicensed bands radio network nodes and communication terminals need to obey certain rules. One such rule is that a transmitting device needs to listen on the carrier before the transmitting device starts to transmit. If the carrier is free the transmitting device may transmit while if the carrier is busy, e.g. some other node or device is transmitting, the transmitting device needs to suppress the transmission and the transmitting device may try again at a later time. This is referred to as a Listen Before Talk (LBT) process. The LBT is a special type of carrier sense multiple access (CSMA) mechanism for accessing the channel, carrier or medium. The embodiments are therefore applicable to any type of CSMA scheme. Due to LBT a transmission in an unlicensed band may be delayed until the carrier, also referred to as medium, becomes free again. And in case there is no coordination between the transmitting devices, which often is the case, the delay may appear random.

In one exemplary implementation the LBT is performed periodically with a period equal to certain units of time; as an example one unit of time duration i.e. 1 Transmission Time Interval (TTI), 1 time slot, 1 subframe etc. The duration of listening in LBT is typically in the order of few to tens of psec. For the LBT purpose, each LTE subframe is divided in two parts: in the first part, the listening takes place and the second part carries data if the channel is seen to be free. The listening occurs at the beginning of the current subframe and determines whether or not data transmission will continue in this subframe and a few next subframes. Hence, the data transmission in a subframe P until subframe P+n is determined by the outcome of listening during the beginning of subframe P. The number n depends on system design and/or regulatory requirements.

Due to LBT, there will be some instances or occasions where the radio network node is unable to transmit a reference signal in a designated reference signal occasion, such as a Discovery reference Signal (DRS) in a DRS occasion. The wireless communication network has certain preconfigured reference signal occasions known to the wireless device and these are called designated reference signal occasions. If LBT is applied to DRS transmissions, there will be some instances where the DRS is not able to be transmitted in a periodic manner as in the case of the Rel-12 DRS transmitted on a cell in licensed spectrum. The following two options or alternative may then be considered for DRS design for LAA.

Alt 1. Subject to LBT, DRS is transmitted in fixed time position within the configured discovery measurement timing configuration (DMTC)

Alt 2. Subject to LBT, DRS is allowed to be transmitted in at least one of different time positions within the configured DMTC The two alternatives above are shown in FIG. 1b.

Radio Resource Management (RRM) Measurements in LTE

In LTE an RRM measurement framework exists, according to which the radio network node can configure the communication terminal to report to the radio network node when the communication terminal is finding an LTE cell which has e.g. signal strength about a configured threshold. The communication terminal would, when configured with such a configuration, scan for LTE cells and if the communication terminal finds an LTE cell with signal strength above the configured threshold in a designated reference signal occasion, would trigger a measurement report.

The radio network node uses these signal measurements to perform mobility procedures for the communication terminal, e.g. to add additional carriers for the communication terminal to boost the communication terminal's throughput, remove poor cells for the communication terminal, do handovers to a better cell, etc.

The signal measurements are done by the communication terminal on the serving one or more cell, multiple serving cells may be with CA, as well as on neighbor cells over some known reference symbols or pilot sequences. In case of LAA the signal measurements will be done by the communication terminal on discovery reference signals (DRS) transmitted by the cells of the unlicensed carriers. The transmissions of the DRS occur in DRS occasions. The signals comprising the DRS may e.g. include the Primary Synchronization Signal (PSS), Secondary Synchronization Signal (SSS), Common reference signal (CRS), Channel State Information Reference Signal (CSI-RS) etc. The communication terminal is configured with a discovery measurement timing configuration (DMTC) which is a time window within which the communication terminal can receive the DRS. The DMTC provides a window with a duration, also known as DRS occasion duration e.g. between 1-6 ms, occurring with a certain periodicity and timing within which the communication terminal may expect to receive discovery signals. Examples of DRS periodicity are 40, 80 or 160 ms. Examples of communication terminal measurements are cell identification, Cell Global Identity (CGI) acquisition, Reference Signal Received Power (RSRP), Reference Signal Received Quality (RSRQ), received signal strength indicator (RSSI) etc.

Due to e.g. LBT failure, there will be some instances or occasions where the radio network node is unable to transmit DRS in every DRS occasion. If LBT is applied to DRS transmissions and there is LBT failure, e.g. the carrier is busy, then there will be some instances where the DRS is not able to be transmitted in a periodic manner. Thus, signal measurements may be erroneous at the communication terminal leading to a limited or reduced performance of the wireless communication network.

SUMMARY

An objective of embodiments herein is to provide a mechanism that improves performance of the wireless communication network.

According to an aspect the objective is achieved by providing a method performed by a communication terminal for handling signal measurements in a wireless communication network. The communication terminal adapts a measurement procedure to construct a measurement sample of a reference signal from a cell operated by a radio network node, or adjusts a filter algorithm of the measurement procedure based on one or more previous valid measurement samples of a previous reference signal from the cell when measuring on the cell where reference signals are not available for the communication terminal at every designated reference signal occasion.

According to another aspect the objective is achieved by providing a method performed by a radio network node for configuring a communication terminal for performing a measurement procedure. The radio network node configures the communication terminal with configuration data indicating one or more parameters which the communication terminal uses for constructing a measurement sample based on a previous valid measurement sample of a previous reference signal from the radio network node to account for that reference signals are not available for the communication terminal at every designated reference signal occasion. For example, the communication terminal may account for that a reference signal is not transmitted by the second radio network node or an invalid or unreliably received reference signal is received at the communication terminal during at least one reference signal transmission occasion.

Furthermore, a communication terminal and radio network node are herein provided to perform the methods herein.

A communication terminal is herein provided for handling signal measurements in a wireless communication network. The communication terminal is configured to adapt a measurement procedure to construct a measurement sample of a reference signal from a cell operated by a radio network node or to adjust a filter algorithm of the measurement procedure based on one or more previous valid measurement samples of a previous reference signal from the cell, when measuring on the cell where reference signals are not available for the communication terminal at every designated reference signal occasion.

A radio network node is also herein provided for configuring a communication terminal for performing a measurement procedure. The radio network node being adapted to configure the communication terminal with configuration data indicating one or more parameters which the communication terminal uses for constructing a measurement sample based on a previous valid measurement sample to account for that reference signals are not available for the communication terminal at every designated reference signal occasion.

It is herein also provided a computer program comprising instructions, which, when executed on at least one processor, cause the at least one processor to carry out the methods herein, as performed by the radio network node or the communication terminal. Furthermore, it is herein provided a computer-readable storage medium, having stored thereon a computer program comprising instructions which, when executed on at least one processor, cause the at least one processor to carry out the methods herein, as performed by the radio network node or the communication terminal.

Embodiments herein provide means to ensure that e.g. a measurement report received from the communication terminal is based on more reliable samples being based on previous valid measurement samples or signal measurements and thus the samples can therefore be considered more reliable. The communication terminal may e.g. construct a measured value or measurement sample in place of a missed sample based on previous valid measurement samples and/or the communication terminal may adjust the filter algorithm in response to one or more missed samples based on previous valid measurement samples and e.g. age of previous valid measurement samples. The constructed measurement sample or the adjusted filter algorithm may further then be used in the measurement procedure, e.g. the constructed measurement sample may be taken into account when deciding whether to trigger measurement reporting or not. This results in an improved performance of the wireless communication network.

BRIEF DESCRIPTION OF THE DRAWINGS

Embodiments will now be described in more detail in relation to the enclosed drawings, in which:

FIG. 7 shows a block diagram depicting a radio network node according to embodiments herein.

DETAILED DESCRIPTION

Figure 1A:
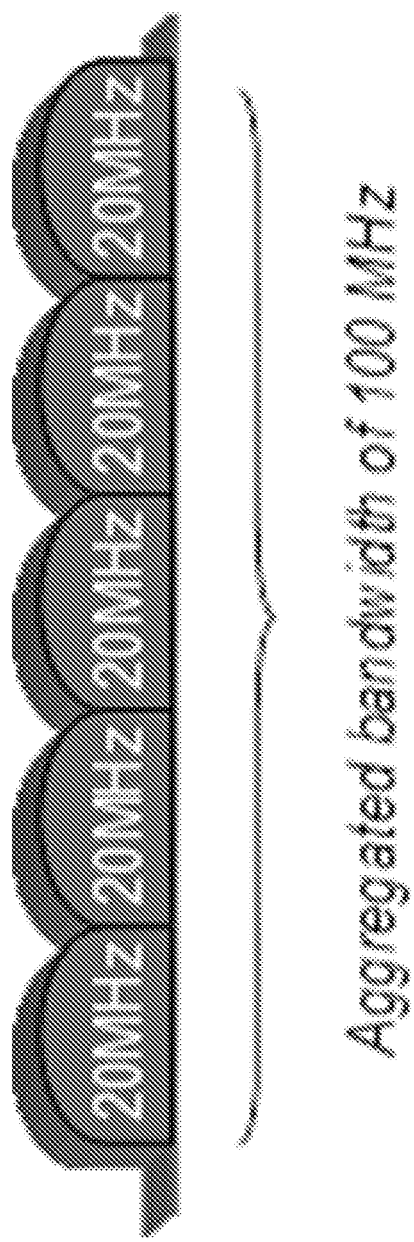
FIG. 1a shows a schematic carrier aggregation.
Figure 1B:
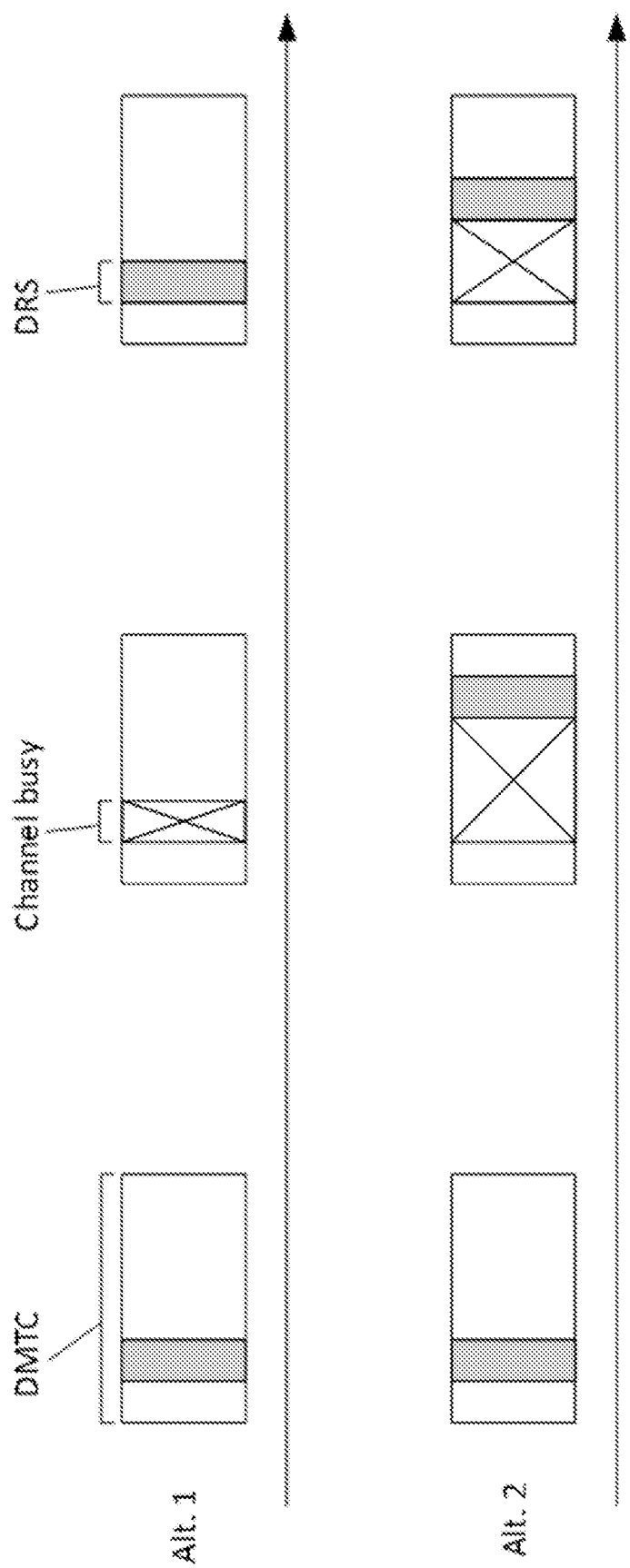
FIG. 1b shows LAA DRS design options.
Figure 2:
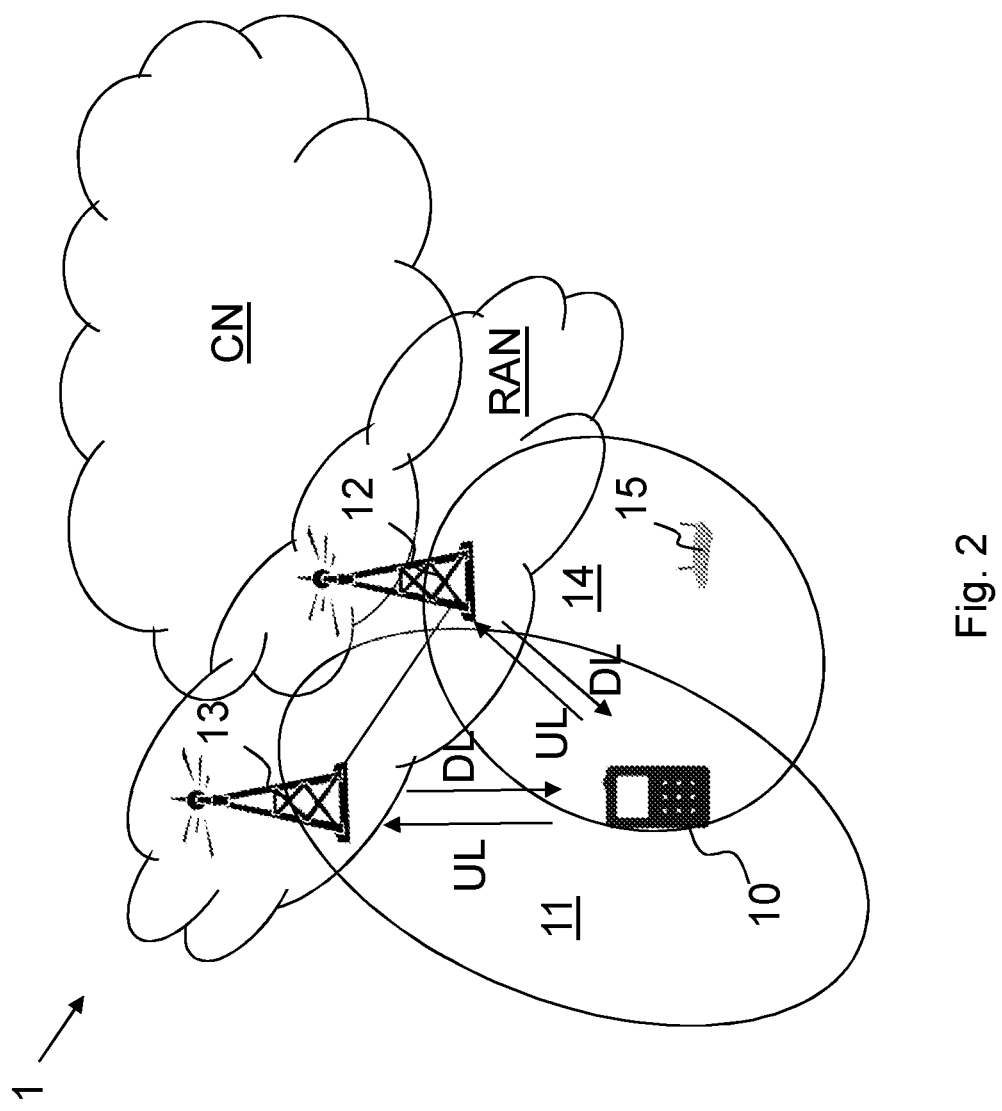
FIG. 2 shows a schematic overview depicting a wireless communication network according to embodiments herein.

Embodiments herein relate to wireless communication networks in general. FIG. 2 is a schematic overview depicting a wireless communication network 1. The wireless communication network 1, also referred to as a radio communications network or communications network, comprises one or more RANs and one or more CNs. The wireless communication network 1 may use one or more out of a number of different technologies, such as Long Term Evolution (LTE), Wi-Fi, 5G, LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a communication terminal 10, also known as a wireless device, a user equipment (UE) and/or a wireless terminal, communicates via a Radio Access Network (RAN) to one or more core networks (CN). The communication terminal 10 herein can be any type of UE or wireless device capable of communicating with a radio network node or another communication terminal over radio signals. The communication terminal may also be a radio communication device, a target device, a device to device communication terminal, a machine type communication terminal or a communication terminal capable of machine to machine communication, a sensor equipped with communication terminal, a Tablet, a mobile terminals, a smart phone, a laptop embedded equipped (LEE), a laptop mounted equipment (LME), an USB dongles, a Customer Premises Equipment (CPE) etc.

Communication terminals connect in a licensed spectrum, to a first cell 11 e.g. a Primary Cell (PCell), and may use carrier aggregation to benefit from additional transmission capacity in an unlicensed spectrum, whereby they connect to a second cell 14 e.g. a Secondary Cell (SCell) also referred to as Licensed Assisted Access (LAA) SCell. To reduce the changes required for aggregating licensed and unlicensed spectrum, a frame timing in the first cell 11 is simultaneously used in the second cell 14.

The wireless communication network 1 covers a geographical area which is divided into cell areas, e.g. the first cell 11 and the second cell 14, being served by radio network nodes. The first cell 11 is e.g. served by a first radio network node 13. The second cell 14 may also be served by the first radio network node 13 but in the illustrated examples herein the second cell 14 is served by a second radio network node 12 providing radio coverage over the second cell 14. The cells may alternatively be served by one and the same radio network node, thus, the first and second radio network node may be the same. The radio network nodes may be access nodes, radio base stations such as NodeBs, evolved Node Bs (eNB, eNode B), Wi-Fi access point base transceiver stations, Access Point Base Stations, base station routers, relay nodes, positioning nodes, E-SMLCs, location servers, repeaters, access points, radio access points, Remote Radio Units (RRU) Remote Radio Heads (RRH), multi-standard radios (MSR) radio nodes such as MSR base station nodes in distributed antenna system (DAS), Self-Organising Network (SON) nodes, Operation and Maintenance (O&M) nodes, OSS, MDT node, Core network node, MME etc. The radio network nodes may serve one or more cells. A cell is a geographical area where radio coverage is provided by radio base station equipment at a base station site or at remote locations in Remote Radio Units (RRU). The cell definition may also incorporate frequency bands and radio network technology used for transmissions, which means that two different cells may cover the same geographical area but use different frequency bands.

The radio network nodes communicate, over the air or radio interface operating on radio frequencies, with the communication terminal 10 within range of the respective radio network node. The communication terminal 10 transmits data over the radio interface to the respective radio network node in Uplink (UL) transmissions and the respective radio network node transmits data over an air or radio interface to the communication terminal 10 in Downlink (DL) transmissions.

Today, the unlicensed 5 GHz spectrum is mainly used by communication terminals implementing the IEEE 802.11 Wireless Local Area Network (WLAN) standard. This standard is known under its marketing brand "Wi-Fi" IEEE 802.11 equipment, also called WLAN equipment, and uses a contention based medium access scheme. This scheme does not allow a wireless medium, such as a carrier or channel, to be reserved at specific instances of time. Instead, IEEE 802.11 equipment or IEEE 802.11 compliant communication devices only support the immediate reservation of the wireless medium following the transmission of at least one medium reservation message, e.g. Request to Send (RTS) or Clear to Send (CTS) or others. To allow the Licensed Assisted (LA)-LTE frame in the secondary cell to be transmitted at recurring time intervals that are mandated by the LTE frame in the primary cell, the LAA system transmits at least one of the aforementioned medium reservation messages to block surrounding IEEE 802.11 equipment from accessing the wireless medium.

The second radio network node 12 serving the second cell 14 may use a carrier of an unlicensed frequency spectrum, which unlicensed frequency spectrum may also be used by an access point 15 such as a WiFi modem, a hotspot or similar. The 3GPP initiative "License Assisted Access" (LAA) aims to allow LTE equipment to operate in an unlicensed 5 GHz radio spectrum. The unlicensed 5 GHz spectrum may thus be used as an extension to the licensed spectrum. Accordingly, the communication terminal 10 may connect in the licensed spectrum to a primary cell (PCell), e.g. the first cell 11, and use carrier aggregation to benefit from additional transmission capacity in the unlicensed spectrum in a secondary cell (SCell), e.g. the second cell 14. To reduce the changes required for aggregating licensed and unlicensed spectrum, an LTE frame timing in the primary cell is simultaneously used in the secondary cell. Regulatory requirements, however, may not permit transmissions in the unlicensed spectrum without prior channel sensing. Since the unlicensed spectrum must be shared with other radios of similar or dissimilar wireless technologies such as the access point 15, a so called Listen-Before-Talk (LBT) method may need to be applied. The second radio network node 12 may perform LBT and hence may need to drop transmissions in case the carrier is busy, which results in that some signals which the communication terminal 10 measures on will not be transmitted and hence the communication terminal 10 cannot perform the signal measurements. If this is the case a communication terminal would perform the measurement reporting even though the signal measurement is not reliable enough as the communication terminal may have performed fewer signal measurements than it would have done if no transmissions were lost.

According to embodiments herein the communication terminal 10 adapts its measurement procedure to create or construct one or more measurement samples or adjusts a filter algorithm based on one or more previous valid measurement samples when measuring on a cell, e.g. the second cell 14, where Reference Signals (RS) are not available at the communication terminal 10, e.g. not transmitted, at every designated RS occasion. The RS, such as a DRS, may not be transmitted by the second radio network node 12 for example due to LBT failure i.e. when the second radio network node 12 cannot access radio channel for transmitting signals. The communication terminal 10 may then use the constructed measurement sample or the adjusted filter algorithm for one or more tasks. Examples of such tasks are: using the measurement samples or a filtered value from the adjusted filter algorithm for evaluation or triggering of one or more measurement events; for reporting the measurement results and/or the triggered events to the network node; for performing cell change (e.g. cell reselection) etc.

The following two embodiments related to the adaptation of the measurement procedure in the communication terminal 10 are described below:

Constructing a sample of a measured value in place of a missed measurement.
According to some embodiments the communication terminal 10 may when an "invalid" sample is taken, construct or create or generate an assumed measurement sample which is used e.g. as input to a layer-3 filtering mechanism. The constructed measurement sample may also be interchangeably called as hypothetical sample, predicted sample, expected sample etc.

Adjusting filter algorithm in response to one or more missed samples.
According to some embodiments the communication terminal 10 may adjust the layer-3 filtering to consider the age of the last valid measurement sample.

It should be noted that it is exemplified herein that the wireless terminal 10 is applying methods for measurements done on LTE carriers/LTE cells operating in unlicensed spectrum. However, the methods may also be applied in other scenarios, for example when the communication terminal 10 is performing WLAN measurements or similar, thus, embodiments are applicable to any type of CSMA scheme.

Figure 3A:
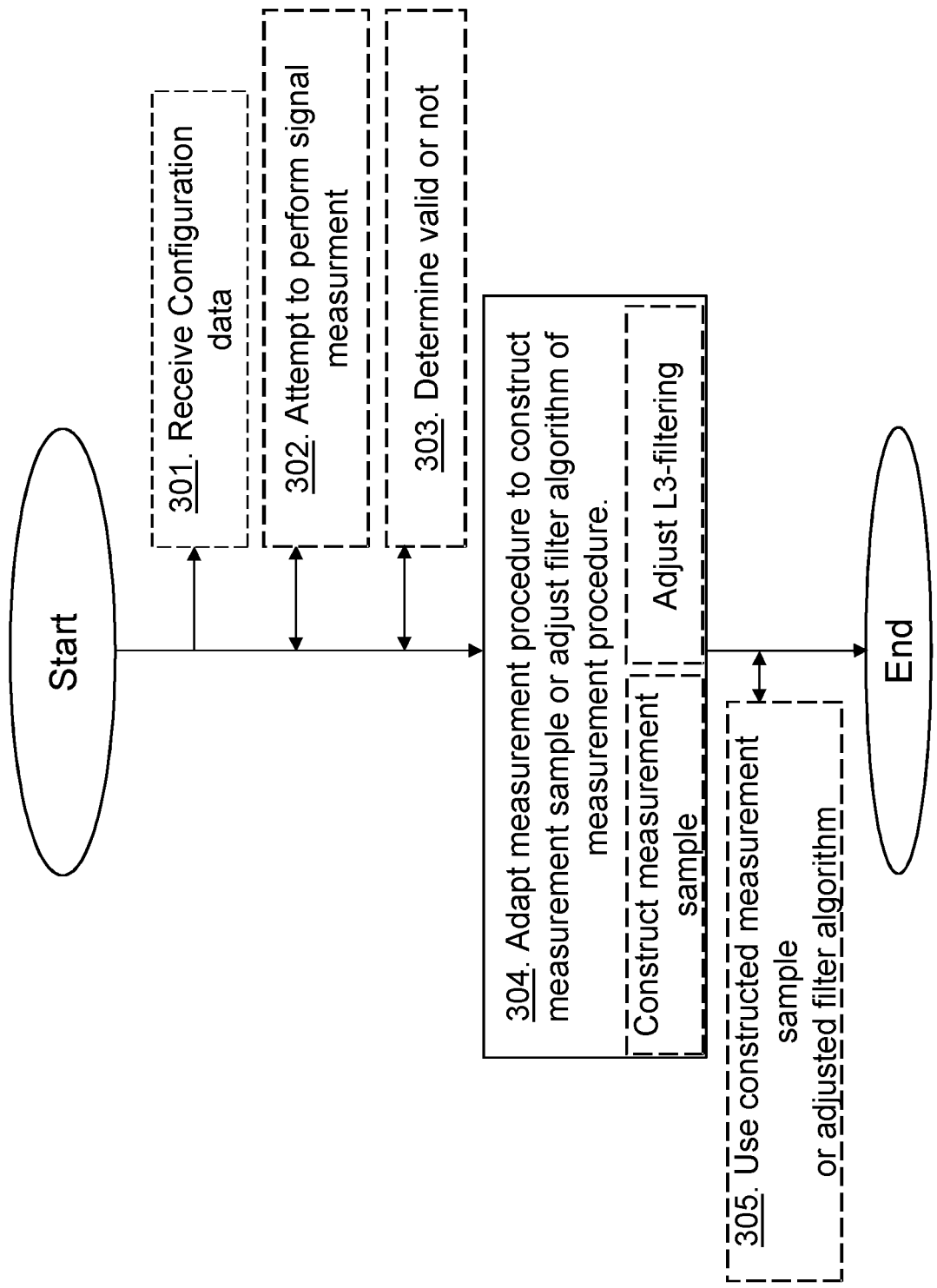
FIG. 3a shows a schematic flowchart according to embodiments herein.

The method actions performed by the communication terminal 10 for handling signal measurements in the wireless communication network 1 according to some embodiments will now be described with reference to a flowchart depicted in FIG. 3a. The actions do not have to be taken in the order stated below, but may be taken in any suitable order. Actions performed in some embodiments are marked with dashed boxes.

Action 301. The communication terminal 10 may receive configuration data, from the first radio network node 13 and/or the second radio network node 12, indicating one or more parameters which the communication terminal 10 uses for constructing a measurement sample based on a previous valid measurement sample to account for that reference signals are not available for the communication terminal 10 at every designated reference signal occasion. For example, the communication terminal 10 may construct measurement samples based on a previous valid measurement sample to account for the reference signal not transmitted by the radio network node or to account for the invalid or unreliably received reference signal at the communication terminal 10 during at least one reference signal occasion, also referred to as RS transmission occasion. The configuration data may further be configuring a rule or rules for reporting signal measurement/s, e.g. one or more measurement reporting criteria or rules relating to signal strength/quality thresholds, timer intervals and/or similar, and/or configuring triggering events or rules to trigger the signal measurements.

Action 302. The communication terminal 10 may attempt to perform a signal measurement or measure a signal e.g. of strength/quality of one or more signals from the second radio network node 12.

Action 303. The communication terminal 10 may determine whether the signal measurement or sample is valid or not. It will herein be used the term "valid" sample or the signal measurement is determined valid. As stated below, the definition of a "valid" sample may be if the communication terminal 10 has detected that the second radio network node 12 has made a transmission which the communication terminal 10 can measure on. Another possible definition is that a sample or measurement is considered valid if the signal strength/quality of a received sample is higher than a validation threshold.

Action 304. The communication terminal 10 adapts the measurement procedure to construct or create one or more measurement samples of the reference signal from the cell operated by the radio network node such as the second radio network node 12. For example, the communication terminal may adapt the measurement procedure to construct the measurement sample of the reference signal from the cell by constructing the measurement sample in place of a missed sample based on a previous valid measurement sample. E.g. the constructed measurement sample may be the previous valid measurement sample, a filtered value of the previous valid measurement sample, or a previous constructed measurement sample or a previous filtered value.

The communication terminal 10 may alternatively adjust the filter algorithm of the measurement procedure based on one or more previous valid measurement samples of a previous reference signal from the cell. The communication terminal 10 may adjust the filter algorithm in response to one or more missed samples, or when receiving a valid measurement sample but previous samples were missed, and the filter algorithm may be based on a previous valid measurement sample and age of the previous valid measurement sample. The communication terminal 10 may e.g. adjust the filter algorithm of the measurement procedure by adjusting a Layer-3 filtering, see description below, to consider an age of the one or more previous valid measurement samples. Thus, the filter algorithm to adjust is based on one or more previous valid measurement samples of a previous reference signal from the cell and/or a present valid measurement sample of the reference signal.

This is performed when measuring on the cell where reference signals are not available for the communication terminal at every designated reference signal occasion. The reference signals may not be available for the communication terminal 10 at every designated reference signal occasion since a reference signal is not transmitted from the radio network node during a carrier sense multiple access scheme. For example, a DRS may not be transmitted by the second radio network node 12 for example due to LBT failure i.e. when the second radio network node 12 cannot access radio channel for transmitting signals.

Action 305. The communication terminal 10 may then use the constructed measurement sample or the adjusted filter algorithm in the measurement procedure e.g. for one or more tasks. Examples of such tasks are using the constructed measurement samples or values from the adjusted filter algorithm for evaluation or triggering of one or more measurement events, for reporting the measurement results and/or the triggered events to the network node, for performing cell change, e.g. cell reselection etc. Thus, the communication terminal 10 may use the constructed measurement sample or values from the adjusted filter algorithm by taking the constructed measurement sample or values from the adjusted filter algorithm into account when deciding whether to trigger a measurement reporting or not.

Layer-3 Filtering

According to current specifications the communication terminal 10 may perform measurements using Layer-1 (L1) filtering, over a L1 measurement period. The communication terminal 10 may further apply an additional filtering to the L1 measurement if configured with a higher layer time domain filter called Layer-3 (L3) filter. The L3 filter is standardized but its L3 filtering coefficient is configured by the radio network node using Radio Resource control (RRC) signaling.

The L3 filter requires the communication terminal 10 to average L1 measurement samples to an L3 averaged value according to a pre-defined expression using the configured value of the L3 filtering coefficient. This filtered value will be used to determine e.g. when a measurement reporting criteria is met and also when configured with L3 filter, the filtered value(s) is signaled to a radio network node such as the first radio network node 13 in a measurement report.

This Layer-3 filtering is done in the RRC layer in the communication terminal 10. The RRC layer receives, from the physical layer (PHY), measured layer-1 samples which are filtered according to the following equation. $M_n$ is a latest sample received from PHY and $F_{n-1}$ is an old filtered value. α is a weight which is calculated based on network configuration and can be set to a high value to give high weight to the latest sample, or to a lower value to give higher weight to the old filtered value.

$$F_n = (1-\alpha) \cdot F_{n-1} + \alpha M_n$$

α is according to current specifications equal to $\frac{1}{2}^{(k/4)}$, where k is a filter coefficient signaled by the radio network node, such as the first radio network node 13.

One motivation for the filtering is to avoid the communication terminal 10 to trigger a measurement report just due to a temporary spike in e.g. RSRP.

In LAA scenarios a transmitter in e.g. the second radio network node 12 may apply a LBT mechanism described above. According to this LBT mechanism the transmitter will sense the medium to determine whether the medium is busy or not on one or more carriers and only in case the medium is considered not busy, the transmitter is allowed to transmit on those carriers.

For certain RRM measurements, e.g. signal strength measurements such as RSRP, the communication terminal 10 will measure on signals transmitted from the second radio network node 12 and report the measured values back to the second radio network node 12 or the first radio network node 13. However in case LBT is applied by the second radio network node 12 the communication terminal 10 will not be able to receive any signal from the second radio network node 12 to measure on. Hence the communication terminal 10 would not be able to judge the channel in those cases when the second radio network node 12 drops the transmission.

If the existing Layer-3 filtering mechanism is applied in LBT scenarios the communication terminal 10 may filter measurement samples which have been performed when the second radio network node 12 did not transmit anything. This will result in the reported value being erroneous and/or that the communication terminal 10 triggers a measurement report when no measurement report should be sent according to the signal conditions between the communication terminal 10 and second radio network node 12 and/or that the communication terminal 10 does not trigger a measurement report even though the signal conditions between the communication terminal 10 and the second radio network node 12 would suggest that the communication terminal 10 should send a measurement report.

The above drawbacks may create unpredictable communication terminal behavior which from a network point of view is complicated to address as different communication terminals may behave differently and this complicates the tuning of the measurement related parameters, e.g. time to trigger (TTT), threshold, hysteresis etc, in the radio network node. Further, worse mobility decisions may be taken due to poor or irrelevant measurement results and hence reduce user experience as a result as the reported values may be unreliable. Thus, the performance of the wireless communication network 1 may be limited or reduced.

However, according to the embodiments herein the communication terminal 10 is configured to perform one or more measurements on reference signal, e.g. DRS, transmitted by e.g. the second radio network node 12. For example, the communication terminal 10 may determine that the RS is not transmitted by the second radio network node 12 or the received reference signal is not reliable or is invalid during at least one known RS transmission occasion during a measurement time, Tm. Thus, the RS is not available at the communication terminal 10. Furthermore, the communication terminal 10 may adapt the measurement procedure in the communication terminal 10 to create or construct measurement samples based on one or more previous valid measurement sample(s) to account for the RS not being available, such as not transmitted by the second radio network node 12 or being invalid or unreliably received RS at the communication terminal 10, during at least one RS transmission occasion. Furthermore, the communication terminal may then perform at least one measurement using the adapted measurement procedure. In some embodiments the communication terminal 10 may use the results of the performed measurements for one or more radio operational tasks e.g. for evaluation of one or more measurement events and/or for reporting results to the radio network node, for cell change etc.

Figure 4:
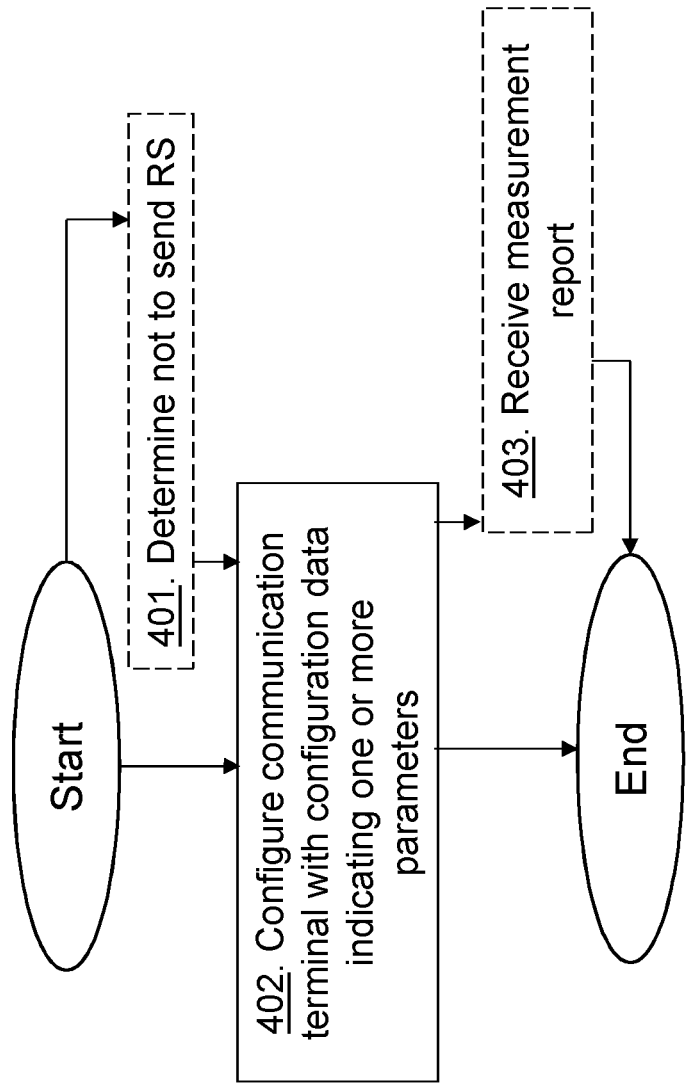
FIG. 4 shows a schematic flowchart according to embodiments herein.

Embodiments herein also apply to a radio network node, e.g. the second radio network node 12 or the first radio network node 13, see FIG. 4 below. For example, the second radio network node 12 may determine that the second radio network node 12 may not be able to transmit one or more reference signals, e.g. DRS, at every RS transmission occasion known to the communication terminal 10 e.g. due to lack of channel access or LBT failure. The first/second radio network node configures the communication terminal 10 with one or more parameters which the communication terminal 10 may use for creating or constructing measurement samples based on previous valid measurement sample(s) to account for that the RS is not e.g. transmitted by the second radio network node 12 or to account for the invalid or unreliably received RS at the communication terminal 10 during at least one RS transmission occasion.

The methods herein ensure that the communication terminal measurements are reliable even when e.g. the second radio network node 12 cannot consistently or regularly transmit the reference signals due to lack of channel access e.g. due to not gaining access, LBT failure. The mobility performance of the communication terminal 10, which relies on the signal measurements of the communication terminal 10, is not degraded even when e.g. the DRS used for the signal measurements cannot be transmitted at regular or periodic intervals.

The term "valid" sample or valid measurement sample is used herein. The communication terminal 10 obtains a sample by measuring signal strength or quality of reference signals, e.g. CRS, in one or more time-frequency resources, e.g. in one or more subframes over 1 or more resource blocks. A sample may be considered "valid" if the communication terminal 10 has detected that the measured signal or the signal that can be measured by the communication terminal 10 has been transmitted by the second radio network node 12. Another possible definition is that a measured sample is considered valid if the signal strength/quality, e.g. RSRP/RSRQ, of the measured sample is higher than a threshold. In another example a measured sample is considered valid if the value of the correlation between of the received signal and of a pre-defined sequence, e.g. pre-defined CRS, is above a threshold. Assuming the correlation varies between 0 and 1, and if the actual value of the correlation for a measured sample is above a threshold, e.g. 0.4, then the communication terminal 10 assumes that the sample is valid; otherwise the sample is assumed to be invalid or unreliable. Conversely, an "invalid" measurement sample is the sample which is not considered "valid". The invalid measurement sample may also interchangeably be denoted as an unreliable sample and the valid measurement sample may also interchangeably be denoted as a reliable sample.

It may be so that the RRC layer in the communication terminal 10 is only informed of "valid" samples from the physical layer in the communication terminal 10, referred to as PHY. And hence RRC can take an action depending on whether a sample is considered "valid" or not "valid.

As an Example of Action 304 Above the Constructed Measurement Sample Takes a Last Actual Sampled Value (L1 Value)

One possible value which the constructed measurement sample is taking is the value of a last valid measurement sample, e.g. $M_n$ is set to $M_{n-1}$ by the communication terminal 10. The actual sampled value herein means the value obtained by the L1 layer of the communication terminal 10, i.e. actual value or valid measurement sample is aka previous L1 measurement sample.

Figure 3B:
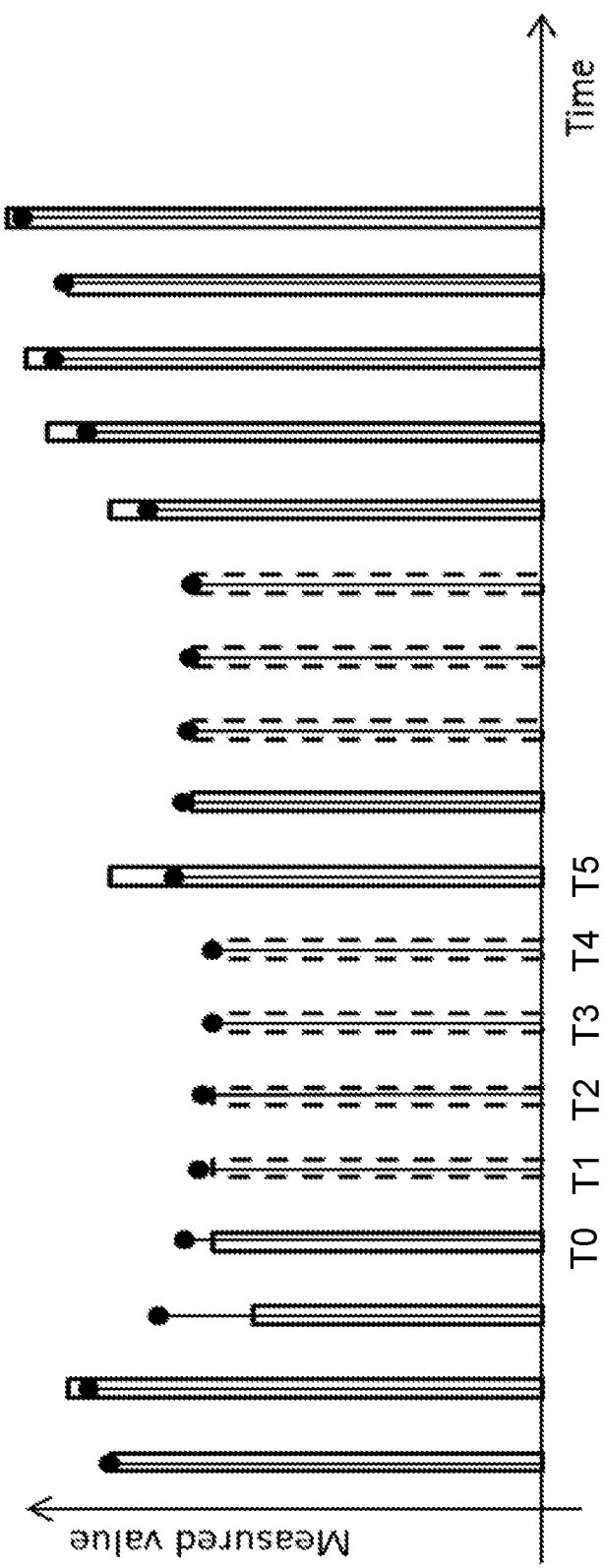
FIG. 3b shows a diagram depicting samples of signal measurements.

In FIG. 3b it is shown as an example of signals the communication terminal 10 measures, the measured metric may be e.g. LTE RSRP. The samples are typically obtained on signals, e.g. DRS, of the measured cell by the physical layer of the communication terminal 10 at regular intervals. However due to e.g. LBT failures the second radio network node 12 of the measured cell may not transmit signals at every designated reference signal occasion. Therefore any sample obtained or constructed by the communication terminal 10 at any RS occasion when signals are muted by the second radio network node 12 are termed as invalid or unreliable.

In the FIG. 3*b* valid measurement samples are shown with solid bars and invalid measurement samples are shown with dashed bars. The dots indicate the current Layer-3 filtered value. As can be seen in the example, when a sample is considered invalid, the communication terminal 10 assumes or constructs the sample whose measured value is equal to the measured value of the previous valid measurement sample. For example, the fifth, sixth, seventh and eighth samples shown in FIG. 3*b*, which are invalid measurement samples, are constructed to take the same value as the previous valid measurement sample, i.e. the fourth sample. If the last valid measurement sample at a measurement sampling time instance, T0, was −90 dBm of RSRP, then during the subsequent measurement sampling time instances T1, T2, T3 and T4 the invalid measurement samples are also constructed by the communication terminal 10 of −90 dBm of RSRP. It is assumed that at time instances T1, T2, T3 and T4 there are no DRS transmissions by the second cell 14 or the second radio network node 12 on which measurements are done e.g. cessation of DRS due to LBT failure. It can also be seen that the resulting Layer-3 filtered value of the constructed measurement samples, i.e. the dots, therefore approach the value of the last valid measurement sample prior to the invalid measurement sample(s).

When later a valid measurement sample is taken by the communication terminal 10, i.e. sample number nine in the example, the communication terminal 10 would filter the ninth sampled value with the previous Layer-3 filtered value.

FIG. 3*b* shows a measurement sampling of reference signals, e.g. DRS, transmitted by a cell operated by the second radio network node 12 on unlicensed carrier, where each invalid measurement sample generates a sample that is based on the previous L1 sample.

As an Example of Action 304 Above the Constructed Measurement Sample Takes a Higher Layer Filtered Value (L3 Value)

One possible value which the assumed/constructed measurement sample takes is the value of the current Layer-3 filtered value. E.g. $M_n$ is set to $F_{n-1}$ by the communication terminal 10.

Figure 3C:
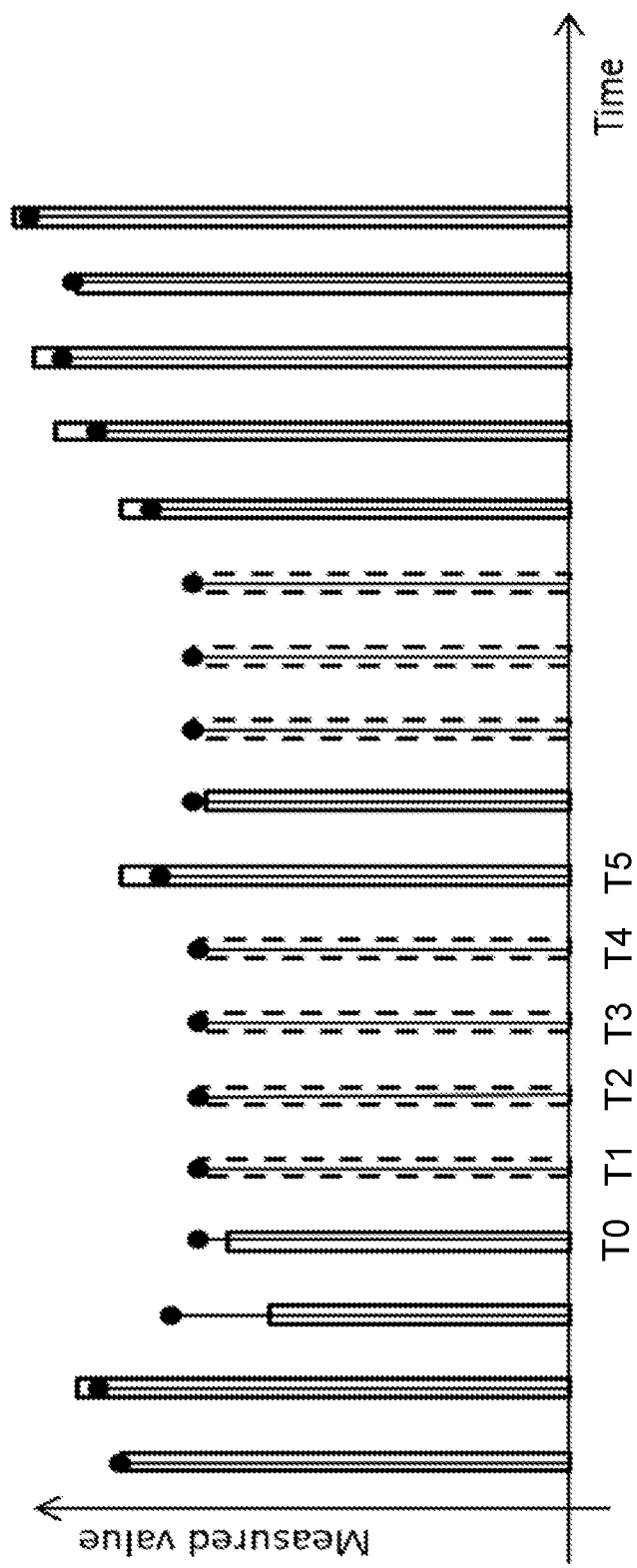
FIG. 3c shows a diagram depicting samples of signal measurements.

In FIG. 3*c* it is shown an example of signals the communication terminal 10 measures, the measured metric may be e.g. LTE RSRP. Similarly to the FIG. 3*b*; valid measurement samples are shown with solid bars and invalid measurement samples are shown with dashed bars. Furthermore, the dots indicate the current Layer-3 filtered value. As can be seen in FIG. 3*c*, when a sample is considered invalid, the communication terminal 10 constructs a sample equaling to the current Layer-3 filtered value. For example, the fifth, sixth, seventh and eighth samples shown in the FIG. 3*c*, which are invalid measurement samples, are constructed to take the same value as the previous Layer-3 filtered value.

It can also be seen that the resulting Layer-3 filtered value (dots) therefore would not be changed due to an invalid measurement sample as the already existing filtered value will be filtered together with itself.

FIG. 3*c* shows a measurement sampling of signals, e.g. DRS, transmitted by a cell operated by the second radio network node 12 on unlicensed carrier, where invalid measurement samples are adjusted and based on the previous L3 filtered sample.

This is an Example of Action 304 where the Communication Terminal 10 Adjusts the Filter Algorithm in Response to Missed Samples.

In one set of embodiments the communication terminal 10 may adjust the L3 filtering to consider the age of previous valid measurement samples.

The communication terminal 10 may, when averaging the existing filtered value, $F_{n-1}$, in the Layer-3 filtering formula above, with a new sample apply weights, which weights may be referred to as alpha and beta. In a special case alpha is a function of beta. The communication terminal 10 may then use as Layer-3 filtering using a generalized function as follows:

$$F_n = f(F_{n-1}, \alpha, M_n, \text{alpha}, \text{beta}).$$

In a particular implementation an example of specific function is as follows:

$$F_n = \text{alpha} \cdot (1-\alpha) \cdot F_n + \text{beta} \cdot \alpha \cdot M_n$$

The parameters alpha and beta are chosen to give different weightage to the current sample ($M_n$) and previously filtered sample ($F_{n-1}$). This in turn affects the values of the L3 filtered value i.e. $F_n$, which is eventually used for evaluation of measurement events etc. The parameters alpha and beta can be pre-defined, configured by at the communication terminal 10 by the second/first network node or can be communication terminal implementation specific.

The parameters alpha and beta may also be a function of one or more L3 filtering parameters. For example alpha and beta can be a function of the parameter, $\alpha$. In a specific example alpha is inversely proportional to a whereas beta is directly proportional to $\alpha$.

The alpha and beta are typically real numbers e.g. can vary between 0 to 5. As an example assume alpha and beta are configured to be 0.5 and 2 respectively. In this example alpha decreases or lowers the weight of the older valid measurement samples, i.e. $F_{n-1}$, whereas the beta increases or augments the weightage of the current or the latest valid measurement sample. It may be so that alpha never becomes negative as this would result in that the filtered value is subtracted from the new sample, which is limited not wanted.

Alpha and beta may be updated each time the communication terminal 10 determines that no valid measurement sample is acquired. Alternatively, alpha and beta is calculated each time a valid measurement sample is acquired.

Alpha and/or beta may have value 1 in the case when no samples has been missed, i.e. there has been no invalid measurement samples since the last valid measurement sample. But they are then updated based on each invalid measurement sample which has occurred since the last valid measurement sample. The communication terminal 10 may autonomously update or adapt the value. In this case for example the adaptation of the values of alpha and/or beta depends on the number of times (K) the LBT failure occurs between the last filtered value, e.g. $F_{n-1}$, and the current measured value, e.g. Mn, thus taking the number of invalid measurement samples into account. For example if K is equal to or larger than threshold, e.g. 4, then the alpha is smaller than alpha-threshold, e.g. 0.5, while the beta is larger beta-threshold, e.g. 2. But for example if K is below a threshold, e.g. 4, then the alpha is larger than or equal to the alpha-threshold, e.g. 0.5, while the beta is smaller than or equal to the beta-threshold, e.g. 2. The values of alpha and beta may also depend on the time duration (Td) between the last filtered sample and the current sample. For example if the value of Td is above a threshold, e.g. 100 ms, then the value of beta is larger than the value of alpha.

Another possibility is that a is a function of the age of the last valid measurement sample.

Figure 3D:
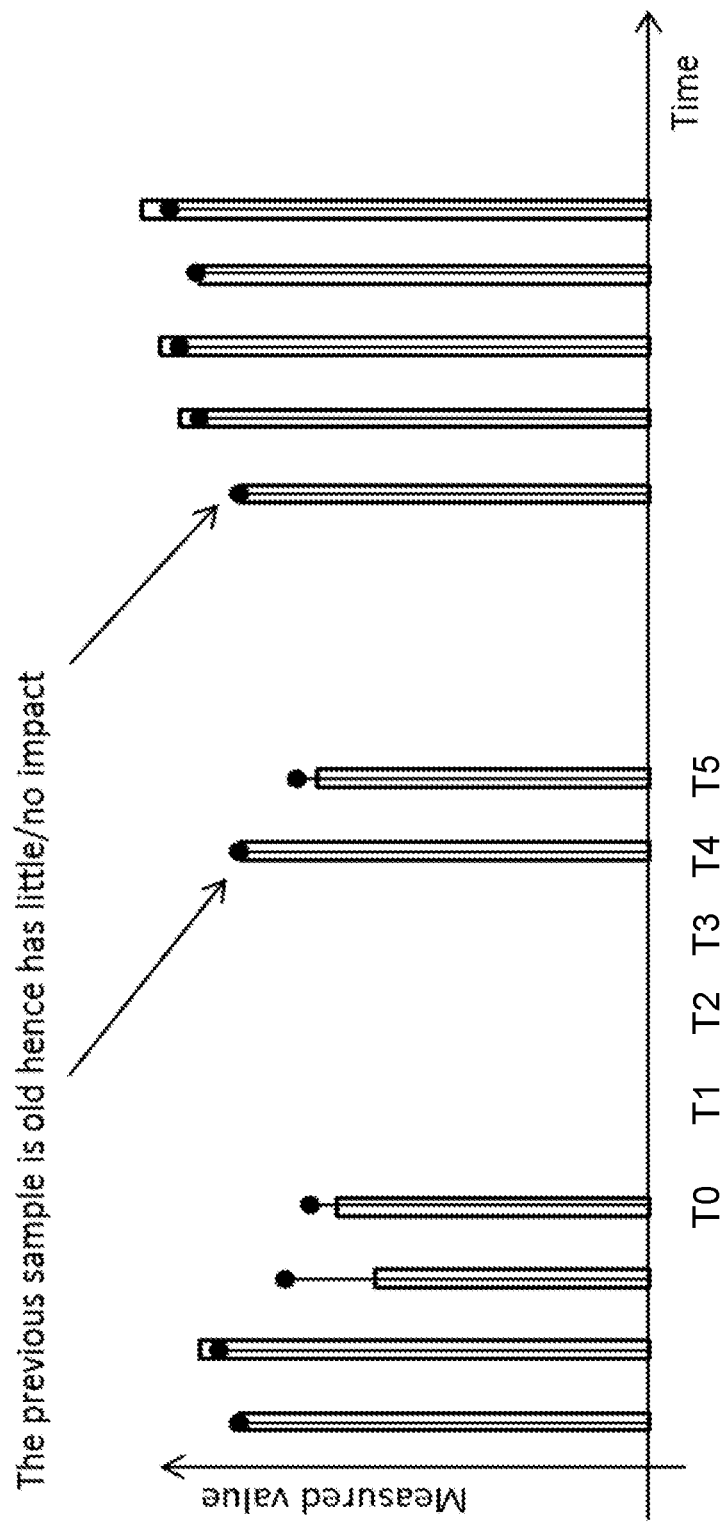
FIG. 3d shows a diagram depicting samples of signal measurements.

FIG. 3d shows an example where the communication terminal 10 adjusts the Layer-3 filtering to consider the age of the last valid measurement sample. As shown, after sample number 4 at time instance T0 there is a gap until the occurrence sample 5 at time instance T5. This is for example due to the fact that e.g. the second radio network node 12 does not transmit DRS in DRS occasions between T0 and T5 i.e. no DRS transmission during time instances T1, T2, T3 and T4. Hence when sample number 5 is taken the last valid measurement sample is old, older than it would have been if the communication terminal 10 managed to get valid measurement samples periodically and without interruptions due to lack of DRS transmissions. Since the last valid measurement sample is old when sample 5 is acquired, the old filtered value, or the old samples, has little or no impact on the resulting Layer-3 filtered value.

FIG. 3d shows thus communication terminal measurement sampling of signals, e.g. DRS, transmitted by a cell operated by e.g. the second radio network node 12 on unlicensed carrier, where the communication terminal 10 adjusts the value of the valid measurement samples based on the previous L3 filtered sample and also on the number of missed samples or age of previous valid measurement sample.

The embodiments herein provide means to ensure that e.g. a measurement report received from the communication terminal 10 is considered more reliable than if the embodiments are not applied. This therefore improves mobility decisions and ultimately user experience and system performance.

The method actions performed in the radio network node, which may be one of the first and/or second radio network node 12, for configuring the communication terminal 10 for performing a measurement procedure e.g. in the wireless communication network 1 according to some embodiments will now be described with reference to a flowchart depicted in FIG. 4.

Action 401. The radio network node may determine that the radio network node or the other radio network node is not able to transmit one or more reference signals at every designated reference signal occasion known to the communication terminal 10. E.g. determine that the radio network node is not able to transmit one or more reference signals, e.g. DRS, at every RS transmission occasion known to the communication terminal 10 e.g. due to lack of channel access or LBT failure.

Action 402. The radio network node configures the communication terminal with configuration data indicating one or more parameters, e.g. alpha and beta mentioned above, which the communication terminal 10 uses or may use for creating or constructing a measurement sample based on a previous valid measurement sample to account for that reference signals are not available for the communication terminal 10 at every designated reference signal occasion. For example, the communication terminal 10 uses the one or more parameters for constructing the measurement sample based on the previous valid measurement sample to account for that a reference signal is not transmitted by the radio network node or another radio network node 12 or to account for that an invalid or unreliably received reference signal is received at the communication terminal during at least one designated reference signal occasion.

Action 403. The radio network node may then receive from the communication terminal 10 the measurement report. This may be used in a mobility procedure or similar.

Figure 5:
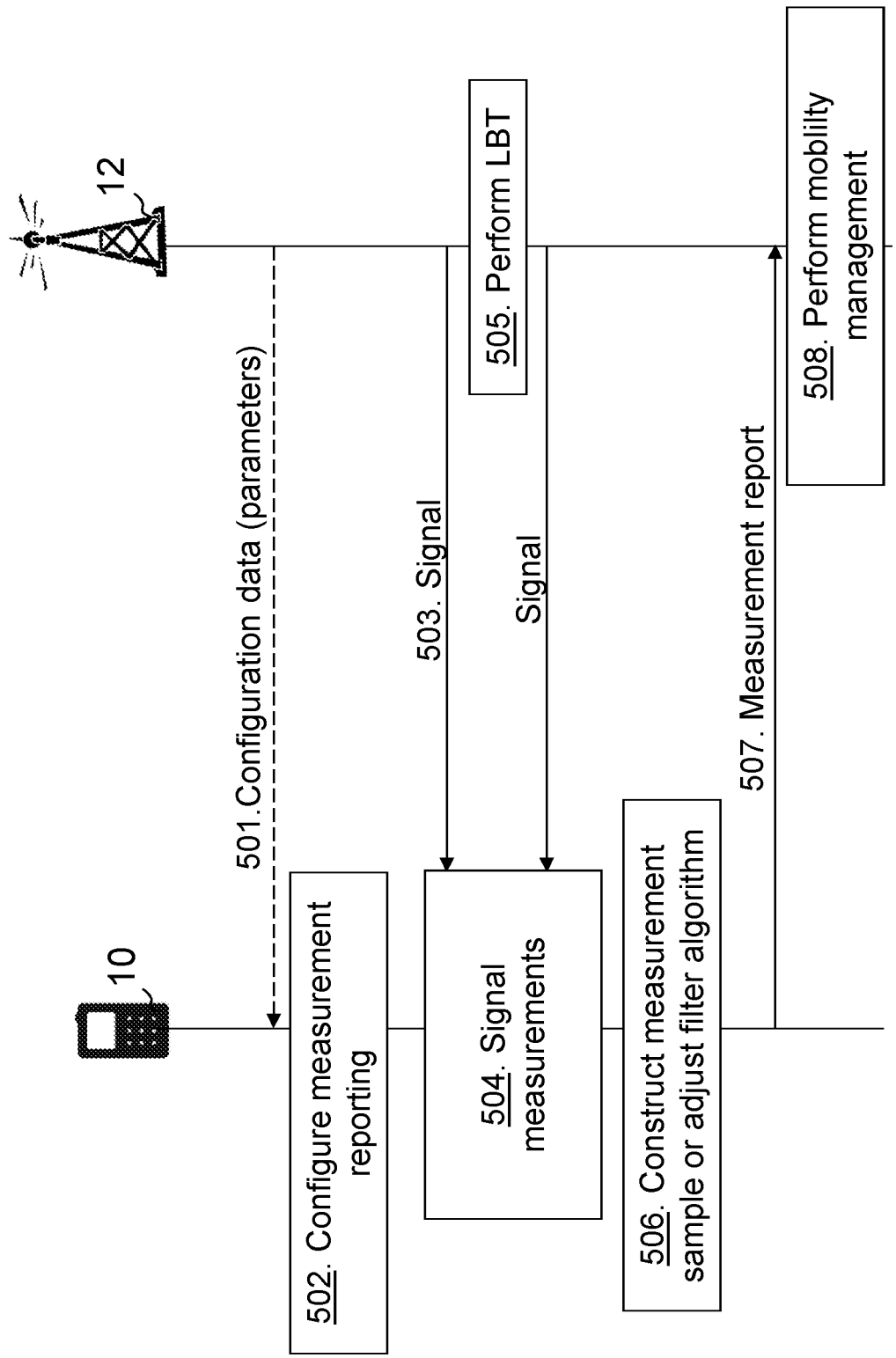
FIG. 5 shows a schematic combined signalling scheme and flowchart depicting embodiments herein.

FIG. 5 is a combined signaling scheme and flowchart depicting some embodiments herein. The radio network node is exemplified as the second radio network node 12 and the method is exemplified for handling measurement reporting.

Action 501. The second radio network node 12 transmits the configuration data to the communication terminal 10. This might, as stated above, alternatively be done by the first radio network node 13.

Action 502. The communication terminal 10 uses the received configuration data and sets up the configuration for measurement reporting.

Action 503. The second radio network node 12 transmits signals, such as reference signals.

Action 504. The communication terminal 10 attempts to perform signal measurements on the signals, measuring samples of the signals of e.g. strength and/or quality.

Action 505. The second radio network node 12 may perform LBT and may not be allowed access to the radio channel, whereby the reference signal is not transmitted in a designated reference signal occasion.

Action 506. The communication terminal 10 adapts or adjusts measurement procedure e.g. construct measurement samples or adjust filter algorithm based on one or more previous valid measurement sample(s) when measuring on the cell where reference signals are e.g. not transmitted at every designated RS occasion. E.g. the communication terminal 10 may adjust the L3 filtering to compensate for invalid measurement samples. The communication terminal 10 may e.g. modify the filtering-function to weigh them more/less depending on age of the last valid measurement sample. E.g. in case a valid measurement sample is received after a numerous of invalid measurement samples, e.g. 5, the measured sample may be used as the filtered value directly, that is, alpha mentioned above is set to zero.

Action 507. The communication terminal 10 may then determine whether a triggering condition is fulfilled using the adjusted filter algorithm or constructed sample or taking the adjusted filter algorithm or constructed measurement sample into account, and in that case transmit a measurement report to the second radio network node 12, this may be, alternatively or additionally, transmitted to the first radio network node 13.

Action 508. The second radio network node 12 and/or the first radio network node 13 may perform e.g. a mobility management taking the received measurement report into account.

Figure 6:
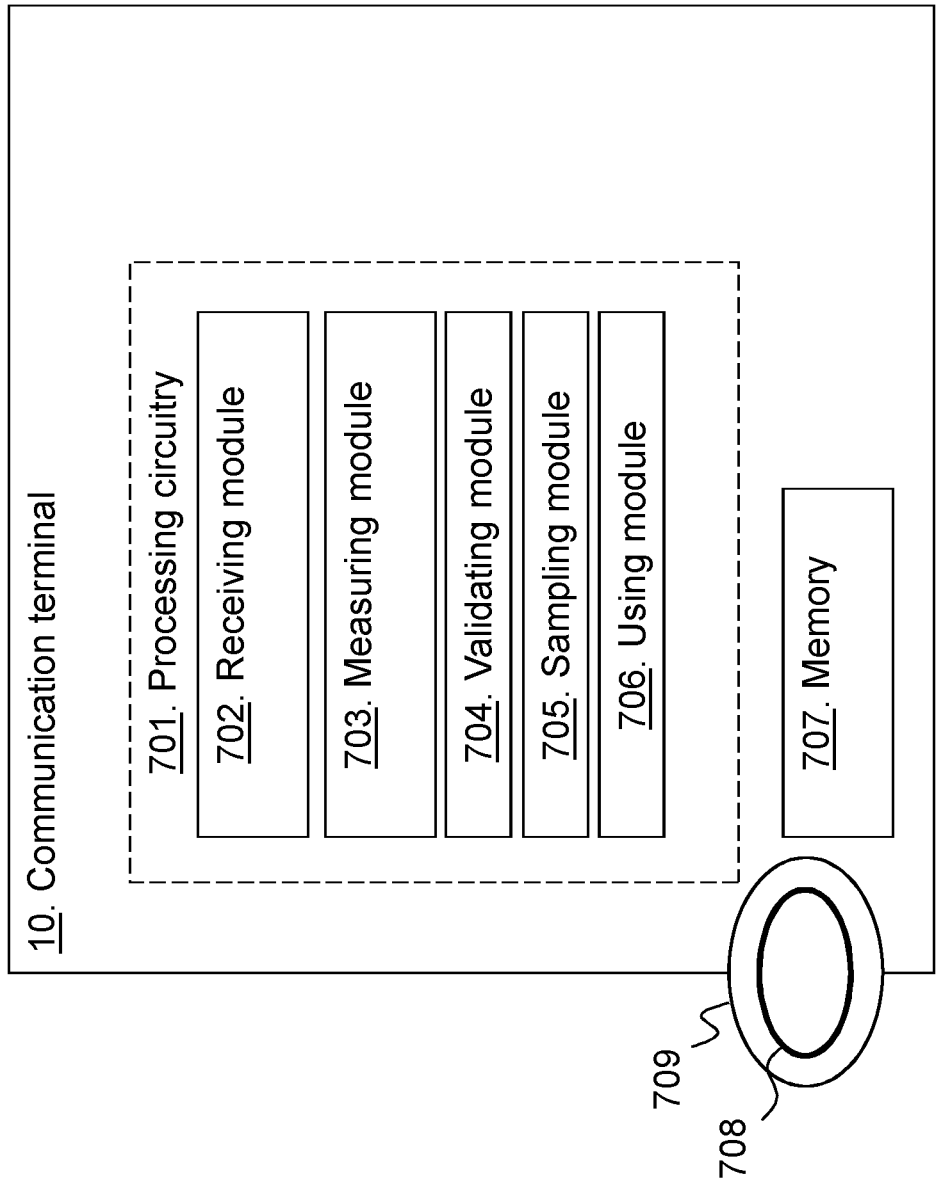
FIG. 6 shows a block diagram depicting a communication terminal according to embodiments herein.

Embodiments herein provide the communication terminal 10 configured to perform the methods described above. FIG. 6 discloses the communication terminal 10 for handling signal measurements, e.g. for measurement reporting, in the wireless communication network 1 configured to perform the methods herein.

The communication terminal 10 may comprise processing circuitry 701 configured to perform the methods herein.

The communication terminal 10 may comprise a receiving module 702. The communication terminal 10, processing circuitry 701 and/or the receiving module 702 may be configured to receive configuration data from the first radio network node 13 and/or the second radio network node 12. The communication terminal 10, processing circuitry 701 and/or the receiving module 702 may be configured to receive configuration data indicating one or more parameters which the communication terminal is configured to use for constructing a measurement sample based on a previous valid measurement sample to account for that reference signals are not available for the communication terminal 10 at every designated reference signal occasion. E.g. constructing measurement samples based on a previous valid measurement sample to account for the reference signal not transmitted by the radio network node or to account for the invalid or unreliably received reference signal at the communication terminal 10 during at least one reference signal occasion.

The communication terminal 10 may further comprise a measuring module 703. The communication terminal 10, processing circuitry 701 and/or the measuring module 703 may be configured to attempt to perform signal measurement or measure a signal e.g. of strength/quality of one or more signals from the second radio network node 12 configured.

The communication terminal 10 may further comprise a validating module 704. The communication terminal 10, processing circuitry 701 and/or the validating module 704 may be configured to determine whether the signal measurement or sample is valid or not.

The communication terminal 10 may further comprise a sampling module 705. The communication terminal 10, processing circuitry 701 and/or the sampling module 705 may be configured to adapt the measurement procedure to construct the measurement sample of the reference signal from the cell operated by the radio network node when measuring on the cell where reference signals are not available for the communication terminal at every designated reference signal occasion. Alternatively, the communication terminal 10, processing circuitry 701 and/or the sampling module 705 may be configured to adjust a filter algorithm of the measurement procedure based on one or more previous valid measurement samples of a previous reference signal from the cell, when measuring on the cell where reference signals are not available for the communication terminal at every designated reference signal occasion. E.g. the communication terminal 10, processing circuitry 701 and/or the sampling module 705 may be configured to create or construct one or more measurement samples or adjusts filter algorithm based on one or more previous valid measurement sample(s) when measuring on a cell where reference signals are not transmitted at every designated RS occasion. The communication terminal 10, processing circuitry 701 and/or the sampling module 705 may be configured to adapt the measurement procedure to construct the measurement sample of the reference signal from the cell by being configured to construct the measurement sample in place of a missed sample based on a previous valid measurement sample, or may be configured to adjust the filter algorithm in response to one or more missed samples and is based on a previous valid measurement sample and age of the previous valid measurement sample. The communication terminal 10, processing circuitry 701 and/or the sampling module 705 may be configured to adjust the filter algorithm by being configured to adjust a layer-3 filtering to consider an age of the one or more previous valid measurement samples.

Reference signals may not be available for the communication terminal at every designated reference signal occasion since a reference signal is not transmitted from the radio network node during a carrier sense multiple access scheme.

The communication terminal 10 may further comprise a using module 706. The communication terminal 10, processing circuitry 701 and/or the using module 706 may be configured to use the constructed measurement sample or the adjusted filter algorithm in the measurement procedure, e.g. to then use the constructed measurement sample for one or more tasks. The communication terminal 10, processing circuitry 701 and/or the using module 706 may be configured to use the constructed measurement sample by being configured to take the constructed measurement sample into account when whether to trigger a measurement reporting or not.

The communication terminal may be configured to store the one or more measurements at the communication terminal 10 in a memory 707. The memory 707 may comprise one or more memory units and be configured to be used to store data on, such as values, measurements, thresholds, applications to perform the methods disclosed herein and similar.

The embodiments herein for handling the measurement reporting may be implemented by means of e.g. a computer program 708 or a computer program product, comprising instructions, i.e., software code portions, which, when executed on at least one processor, cause the at least one processor to carry out the actions described herein, as performed by the communication terminal 10. The computer program 708 may be stored on a computer-readable storage medium 709, e.g. a disc or similar. The computer-readable storage medium 709, having stored thereon the computer program 708, may comprise the instructions which, when executed on at least one processor, cause the at least one processor to carry out the actions described herein, as performed by the communication terminal 10. In some embodiments, the computer-readable storage medium may be a non-transitory computer-readable storage medium.

In order to perform the methods herein a radio network node 100 is provided and configured to perform the methods herein. FIG. 7 shows a block diagram depicting the radio network node 100 according to embodiments herein for handling measurement reporting from the communication terminal 10 in the wireless communication network 1.

The radio network node 100 may comprise processing circuitry 801 configured to perform the methods herein.

The radio network node 100 may further comprise a determining module 802. The radio network node 100, processing circuitry 801 and/or the determining module 802 may be configured to determine that the radio network node or the other radio network node is not able to transmit one or more reference signals at every RS occasion known to the communication terminal 10.

The radio network node 100 may comprise a configuring module 803. The radio network node 100, processing circuitry 801 and/or the configuring module 803 may be adapted to configure the communication terminal with configuration data indicating one or more parameters which the communication terminal 10 uses for constructing a measurement sample based on a previous valid measurement sample to account for that reference signals are not available for the communication terminal 10 at every designated reference signal occasion. The radio network node 100, processing circuitry 801 and/or the configuring module 803 may e.g. be configured to configure the communication terminal 10 with configuration data indicating one or more parameters which the communication terminal 10 may use for creating or constructing measurement samples based on previous valid measurement sample(s) to account for the RS not transmitted by the second radio network node 12 or the other radio network node, or to account for the invalid or unreliably received RS at the communication terminal 10 during at least one RS occasion.

The radio network node 100 may further comprise a receiving module 804. The radio network node 100, processing circuitry 801 and/or the receiving module 804 may be configured receive from the communication terminal 10 the measurement report. The radio network node 100, and/or the processing circuitry 801 may be configured to take a decision based on the received measurement report.

The radio network node 100 further comprises a memory 805 configured to be used to store data, such as values, thresholds, measurements, applications to perform the methods disclosed herein and similar.

The methods according to the embodiments described herein for handling signal measurements, e.g. measurement reporting, may be implemented by means of e.g. a computer program 806 or a computer program product, comprising instructions, i.e., software code portions, which, when executed on at least one processor, cause the at least one processor to carry out the actions described herein, as performed by the radio network node 100. The computer program 806 may be stored on a computer-readable storage medium 807, e.g. a disc or similar. The computer-readable storage medium 807, having stored thereon the computer program, may comprise the instructions which, when executed on at least one processor, cause the at least one processor to carry out the actions described herein, as performed by the radio network node 100. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication terminal or radio network node, for example.

Alternatively, several of the functional elements of the processor/s or processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a communication terminal for handling measurements of reference signals from a cell operated by a radio network node in a wireless communication network, the method comprising:
   in response to one or more missed measurement samples, adjusting a filter algorithm usable when the reference signals from the cell are not available for measuring by the communication terminal at every designated reference signal occasion, wherein:
      the filter algorithm comprises a layer-3 filtering; and
      adjusting the filter algorithm is based on one or more previous measurement samples of a previous reference signal from the cell, and further based on respective ages of the one or more previous measurement samples; and
   using the adjusted filter algorithm in a measurement procedure.

2. A method according to claim 1, further comprising determining whether a signal measurement or sample is valid or not.

3. A method according to claim 1, comprising
   receiving configuration data indicating one or more parameters which the communication terminal uses for constructing a measurement sample based on a previous measurement sample to account for reference signals not being available for the communication terminal at every designated reference signal occasion.

4. A method according to claim 1, wherein reference signals are not available for measuring by the communication terminal at every designated reference signal occasion due to not being transmitted from the radio network node during a carrier sense multiple access scheme.

5. A non-transitory, computer-readable storage medium, having stored thereon a computer program comprising instructions that, when executed on at least one processor comprising a communication terminal, configure the communication terminal to carry out the method according to claim 1.

6. A method performed by a radio network node for configuring a communication terminal for performing a measurement procedure, the method comprising
   configuring the communication terminal with configuration data indicating one or more parameters to use for constructing a measurement sample based on a previous measurement sample to account for reference signals not being available for the communication terminal at every designated reference signal occasion; and
   configuring the communication terminal to use the one or more parameters for constructing the measurement sample based on the previous measurement sample to account for a reference signal not being transmitted by the radio network node or another radio network node or to account for an invalid or unreliably received reference signal being received at the communication terminal during at least one designated reference signal occasion.

7. A method according to any claim 6, further comprising
   determining that the radio network node or the other radio network node is not able to transmit one or more reference signals at every designated reference signal occasion known to the communication terminal.

8. A non-transitory, computer-readable storage medium, having stored thereon a computer program comprising instructions that, when executed on at least one processor comprising a radio network node, configure the radio network node to carry out the method according to claim 6.

9. A communication terminal for handling signal measurements in a wireless communication network, the communication terminal comprising:
  at least one processor; and
  at least one memory storing computer-executable instructions that, when executed by the at least one processor, configure the communication terminal to:
    in response to one or more missed measurement samples, adjust a filter algorithm usable when reference signals from a cell in the wireless communication network are not available for measuring by the communication terminal at every designated reference signal occasion, wherein:
      the filter algorithm comprises a layer-3 filtering; and
      adjusting the filter algorithm is based on one or more previous measurement samples of a previous reference signal from the cell, and further based on the respective ages of the one or more previous measurement samples; and
    use the adjusted filter algorithm in a measurement procedure.

10. A communication terminal according to claim 9, wherein execution of the instructions further configures the communication terminal to determine whether a signal measurement or sample is valid or not.

11. A communication terminal according to claim 9, wherein execution of the instructions further configures the communication terminal to receive configuration data indicating one or more parameters which the communication terminal is configured to use for constructing a measurement sample based on a previous measurement sample to account for that reference signals are not available for the communication terminal at every designated reference signal occasion.

12. A communication terminal according to claim 9, wherein reference signals are not available for measuring by the communication terminal at every designated reference signal occasion due to not being transmitted from a radio network node during a carrier sense multiple access scheme.

13. A radio network node for configuring a communication terminal for performing a measurement procedure, to the radio network node comprising:
  at least one processor; and
  at least one memory storing computer-executable instructions that, when executed by the at least one processor, configure the radio network node to:
    configure the communication terminal with configuration data indicating one or more parameters to use for constructing a measurement sample based on a previous measurement sample to account for reference signals not being available for the communication terminal at every designated reference signal occasion, wherein execution of the instructions configures the radio network node to further configure the communication terminal to use the one or more parameters for constructing the measurement sample based on the previous measurement sample to account for a reference signal not being transmitted by the radio network node or another radio network node or to account for an invalid or unreliably received reference signal being received at the communication terminal during at least one designated reference signal occasion.

14. A radio network node according to claim 13, wherein execution of the instructions further configures the radio network node to:
  determine that the radio network node or the other radio network node is not able to transmit one or more reference signals at every designated reference signal occasion known to the communication terminal.

* * * * *